United States Patent [19]  [11] 3,983,283
Bagley  [45] Sept. 28, 1976

[54] HONEYCOMBED STRUCTURES HAVING OPEN-ENDED CELLS FORMED BY INTERCONNECTED WALLS WITH LONGITUDINALLY EXTENDING DISCONTINUITIES

[75] Inventor: Rodney D. Bagley, Big Flats, N.Y.

[73] Assignee: Corning Glass Works, Corning, N.Y.

[22] Filed: Mar. 18, 1974

[21] Appl. No.: 452,362

[52] U.S. Cl. ............... 428/116; 23/288 FC; 252/477 R; 264/177 R; 264/209; 425/461; 428/188; 428/192
[51] Int. Cl.² ........................................ B32B 3/12
[58] Field of Search .......... 23/288 F, 288 FC; 29/191.4, 455 LM; 161/68; 156/89, 197; 252/477 R; 181/33 G; 428/73, 116, 117, 118, 188, 192; 264/177 R, 209; 425/461

[56] References Cited
UNITED STATES PATENTS

| 3,070,198 | 12/1962 | Haskell | 428/118 X |
|---|---|---|---|
| 3,407,110 | 10/1968 | Axelson et al. | 428/117 |
| 3,616,141 | 10/1971 | Anderson | 161/68 |
| 3,679,384 | 7/1972 | Colson et al. | 65/4 |
| 3,755,204 | 8/1973 | Sergeys | 252/477 R X |
| 3,785,998 | 1/1974 | Hoekstra | 252/477 R |
| 3,790,654 | 2/1974 | Bagley | 264/209 X |
| 3,824,196 | 7/1974 | Benbow et al. | 252/477 R X |
| 3,836,302 | 9/1974 | Kaukeinen | 425/461 X |
| 3,887,741 | 6/1975 | Dwyer | 428/188 |
| 3,919,384 | 11/1975 | Cantaloupe et al. | 264/209 X |

FOREIGN PATENTS OR APPLICATIONS

| 1,231,192 | 5/1971 | United Kingdom | 428/116 |

*Primary Examiner*—Harold Ansher
*Assistant Examiner*—Henry F. Epstein
*Attorney, Agent, or Firm*—Richard N. Wardell; Clarence R. Patty, Jr.

[57] ABSTRACT

Ceramic honeycombed structures comprise open-ended cells formed by discontinuities in the cell walls, which discontinuities extend longitudinally through the structure and transversely through the cell walls. The axial discontinuities which enhance the thermal shock resistance of the structures may be formed during extrusion by obstructing the flow of extrudable material through an extrusion die at predetermined locations.

24 Claims, 12 Drawing Figures

HONEYCOMBED STRUCTURES HAVING OPEN-ENDED CELLS FORMED BY INTERCONNECTED WALLS WITH LONGITUDINALLY EXTENDING DISCONTINUITIES

BACKGROUND OF THE INVENTION

This invention relates to honeycombed structures having thin-walled, open-ended cells, and more particularly, to structures of this type comprising ceramic or similar sinterable materials.

Catalytic reactors which are utilized in emission control devices in automobiles may comprise a ceramic substrate having open-ended cells which extend from one end of the substrate to another where the thin walls forming the open-ended cells are coated with a high surface area, active metal oxide impregnated with a catalytically active substance such as are disclosed in copending application Ser. No. 333,642, filed Feb. 20, 1973 (assigned to the assignee of this application now abandoned). As an alternative, catalytic reactors may comprise honeycombed structures wherein the walls of the open-ended cells comprise a catalytically active substance which is mixed and extruded with ceramic material as disclosed in British patent specification No. 1,142,800 and Belgian Pat. No. 783,126. In structures of this type, hot gases flow through the open-ended cells and reactions are promoted by the catalytically active substance to rid the gases of undesirable pollutants. Similarly, honeycombed structures of this general type are well suited for use as heat exchangers or similar devices subjected to thermal shock conditions.

The foregoing structures which may be utilized in catalytic reactors and heat exchangers may comprise fabricated monoliths such as those disclosed in U.S. Pat. Nos. 3,112,184; 3,444,925 and 3,775,204 or extruded structures such as those described in British patent specification No. 1,142,800, Belgian Pat. No. 783,126 and U.S. Pat. No. 3,790,654. These fabricated and extruded structures result in generally uniform cell walls with a considerable surface area as required for effective use as a catalytic reactor or heat exchanger. It is also desirable that such structures be characterized by a high degree of thermal shock resistance so as to prevent cracking, fracturing or other permanent deformation of the structures during temperature cycling. This thermal shock resistance is particularly important when the structure is to be utilized as a catalytic reactor for an automobile engine which must be started and stopped under all kinds of temperature conditions time and time again without failure of the catalytic reactor.

SUMMARY OF THE INVENTION

It is an object of this invention to provide a thermal shock resistant honeycombed structure having a multiplicity of thin-walled, open-ended cells extending from one end of the structure to the other.

It is a further object of this invention to provide such a structure without substantially sacrificing the total surface area of the cell walls.

In accordance with these objects, the cell walls comprise a plurality of discontinuities extending generally longitudinally through the structure and generally transversely through the cell walls so as to permit lateral contraction and expansion resulting from thermal cycling without cracking or otherwise permanently deforming the structure. By making the width of the discontinuities substantially less than the distance between the adjacent junctions of the walls in the honeycombed structure and preferably less than three times the thickness of the cell walls, thermal shock resistance is provided without any substantial sacrifice in surface area.

In order to provide a high degree of thermal shock resistance, it is desirable to provide a discontinuity in at least one wall in each series of walls of the structure which lie in at least one set of parallel planes wherein the overall length of the series is greater than 50% of the maximum cross-sectional dimension of the structure. In order to optimize thermal shock resistance, at least one cell wall for every ten and preferably five cell walls in each such series should include a discontinuity.

The locations of the discontinuities in the cell walls may vary. In one embodiment of the invention, the discontinuities are located at predetermined junctions of the cell walls. In another embodiment of the invention, the discontinuities are located between the predetermined junctions of the cell walls. In still another embodiment of the invention, the discontinuities are located at certain predetermined junctions and between other predetermined junctions of the cell walls. It may also be desirable to provide the structure with a skin and provide longitudinally extending discontinuities in the skin, which also extend generally transversely through the skin.

It is another object of this invention to provide a method for making the foregoing structures.

In accordance with this object, an extrudable material is flowed through a plurality of openings arranged in a pattern so as to form a monolithic honeycombed structure of thin-walled cells extending longitudinally therethrough. The flow of the extrudable material through the openings is obstructed at predetermined locations to create the longitudinally extending discontinuities in the walls of the cells. In the preferred embodiment of this invention, extrudable material is initially longitudinally flowed through feed passageways. After flowing through the feed passageways, the extrudable material is laterally and longitudinally flowed through a grid work of interconnected discharge slots.

When the discontinuities are to be located at predetermined junctions of the cell walls, the flow of extrudable material is obstructed at the junction of interconnected discharge slots. Where the discontinuities are to be located between predetermined junctions of the cell walls, the flow of extrudable material is obstructed between predetermined junctions of the discharge slots.

It is another object of this invention to provide an apparatus for making the foregoing structures.

In accordance with this object, an extrusion die comprises a die body provided with an inlet face, an outlet face and a plurality of openings extending longitudinally through the die body. The openings include feed passageways communicating with the inlet face and a grid work of interconnected discharge slots communicating with the feed passageways in the outlet face. The apparatus further comprises obstructions in the openings at predetermined locations for forming the longitudinal discontinuities in the cell walls.

In the preferred embodiment of the invention, the obstructions comprise discrete elongated members which are firmly lodged in the discharge slots. In order to firmly lodge the elongated members in place, the slots may include longitudinal grooves which receive portions of the members. In the alternative, the elongated members may be lodged in place by soldering, brazing, welding, adhesive bonding or other suitable means. Also, the obstructions creating the discontinuities may be integrally formed with the die. In one embodiment of the invention, the elongated members comprise pins of substantially circular cross-section which are lodged in place at the junction of or between junctions of discharge slots. In another embodiment of the invention, the elongated members comprise slitters having an elongated cross-section.

DETAILED DESCRIPTION OF A PREFERRED EMBODIMENT

Figure 1:
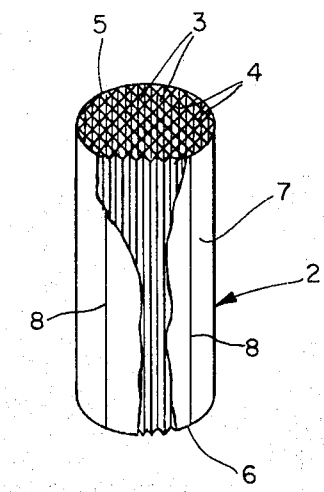
FIG. 1 is a partially broken away, perspective view of the monolithic honeycombed structure embodying this invention.
Figure 2:
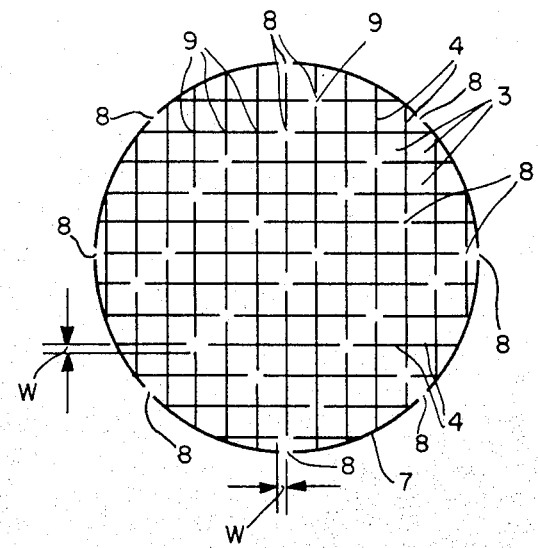
FIG. 2 is an end view of the structure shown in FIG. 1.

FIGS. 1 and 2 illustrate a monolithic honeycombed structure 2 made in accordance with this invention. The structure 2 which is extruded comprises a multiplicity of open-ended cells 3 formed by interconnected walls 4 having parallel cell axes where the cells 3 extend longitudinally through the structure 2 from one end 5 to the other end 6. The periphery of the structure comprises a skin or casing 7.

In accordance with this invention, the thermal shock resistance of the structure is enhanced by providing a plurality of discontinuities 8 in the interconnected cell walls 4 which extend longitudinally through the structure from one end 5 to the other end 6. In addition, the skin 7 includes longitudinally extending discontinuities 8. By dispersing the discontinuities 8, the cell walls 4 are able to expand and contract laterally, opening and closing the space provided at the discontinuities 8, so as to prevent cracking or fracturing when subjected to rapid and extreme changes in temperature such as those encountered in the exhaust system of an automobile engine. In order to maximize the thermal shock resistance, the number of discontinuities in the structure is maximized consistent with the maintenance of structural integrity. However, for many applications, a lesser thermal shock resistance will suffice and a lesser number of discontinuities may be utilized depending upon the environment of the body. But in general, the maximum thermal shock resistance is achieved by providing one discontinuity for every 10 cells and preferably at least one discontinuity for every 5 cells in a series extending from one side of the structure to another.

In order to maximize the surface area of the cell walls 4 thereby making the structure 2 particularly effective as a catalytic reactor when coated with a catalytically active substance, the discontinuities have a width $w$ substantially less than the distance between the junctions 9 of the cell walls 4. Preferably, the width $w$ of the discontinuity is of the order of or less than the thickness of the cell walls 4, e.g., less than three times the thickness of the cell walls so as to maximize the surface area.

As shown in FIGS. 1 and 2, the discontinuities 8 are located at junctions 9 of the cell walls 4. In other embodiments of the invention to be described subsequently, the discontinuities 8 are located between the junctions of the interconnected cell walls 4.

In accordance with another important aspect of this invention, apparatus for extruding the structures of FIGS. 1 and 2 will now be described with reference to FIGS. 3 and 4. The extrusion die apparatus 10 as shown includes a support structure 12 for an extrusion barrel 14 which forms an extrusion chamber 16 receiving an extrusion batch. An extrusion die 18 of any desired configuration extends transversely across the extrusion barrel 14 adjacent the outlet end of the extrusion chamber 16. The die body 18 has an inlet face 20 provided with a plurality of openings or feed passageways 22 communicating with the extrusion chamber 16. The die body 18 also has an outlet face 24 which is provided with the interconnected discharge slots 26. The feed passageways 22 communicate with the junctions of the discharge slots 26 so as to deliver the batch material from the extrusion chamber 16 to the discharge slots 26.

A mask or face plate ring assembly 30 is shown in position below the extrusion die 18. A face plate ring assembly 30 includes a face plate or mask 32, a retainer ring 34 and a plurality of bolts or cap screws 36 for readily removably securing the face plate 32 in position adjacent the outlet face 24 of the die 18 by means of the retainer ring 34. The face plate 32 has a blocking surface 38 which is positioned adjacent the outlet face 24 of the die 18 and surrounds the central opening or orifice 40 having a circular configuration. In those cases where the area of the outlet face 24 containing the discharge slots 26 is larger than the orifice 40, the blocking surface 38 restricts the flow of extrudable material through the die 18 to those areas which are in open communication with the orifice 40. In other words, the blocking surface 38 masks or blocks off the area of the outlet face 24 of the extrusion die 18 which is not required for forming an article of the size and shape represented by the orifice 40 of the particular face plate or mask 32 being utilized.

The orifice 40 has a tapered inlet end portion 42 adjacent the outlet face 24 of the die which tapers toward the extrusion axis $x$—$x$ and an outlet portion 44 which is shown as substantially parallel to the axis of extrusion. The tapered inlet end portion 42 forms the integral skin or casing 7 of the structure at the periphery thereof by moving the peripheral portion of the extruded structure 2 radially inwardly toward the axis of extrusion x—x as shown in FIG. 1. As a result, the peripheral cells of the honeycombed structure 2 collapse to form the integral skin or sheath 7 about the remaining matrix of the structure as it is being extruded.

Depending upon the material being extruded, the angle of taper for portion 42 with respect to the axis of the extrusion x—x may vary anywhere from about 5° to about 60° with the smaller taper being required for a greater longitudinal length through the face plate, whereas the larger taper produces a sharper angle relative to the extrusion axis x—x and requires a greater force to compress the edge material radially inwardly for flow about the outlet portion 44. It has been found, however, that when an angle of taper of the inlet end portion 42 is greater than 30°, it is preferable to provide the inlet portion 42 with a straight entry zone 43 parallel with the axis of extrusion, so as to obtain a smoother skin about the article. Coils 46 in communication with the extrusion barrel 14 are supplied by a source of fluid, e.g., water, which may be thermostatically controlled at desired temperatures as disclosed in copending application Ser. No. 340,023, filed Mar. 12, 1973 (assigned to the assignee of this application now abandoned), incorporated herein by reference.

In accordance with this invention, the discrete elongated elements in the form of pins 48 are lodged in the discharge slots 26 so as to create the discontinuities 8 in the structure 2 as shown in FIGS. 1 and 2. The pins 48 are located at predetermined junctions of the discharge slots in alignment with the feed passageways 22. For clarity, only four of the feed passageways 22 have been shown in FIG. 3. The pins 48 may be lodged in place by means of a force fit, soldering, brazing, welding, adhesive or other suitable means. Also, the obstructions in the slots may be formed integrally with the die body 18 by a chemical machining technique such as that disclosed in U.S. Pat. Nos. 2,628,160; 2,684,911 and 2,971,853. In addition, the outlet portion 44 of the orifice 40 includes radially extending knife-like protrusions 49 spaced circumferentially around the orifice to create longitudinally extending discontinuities 8 in the skin.

Figure 5:
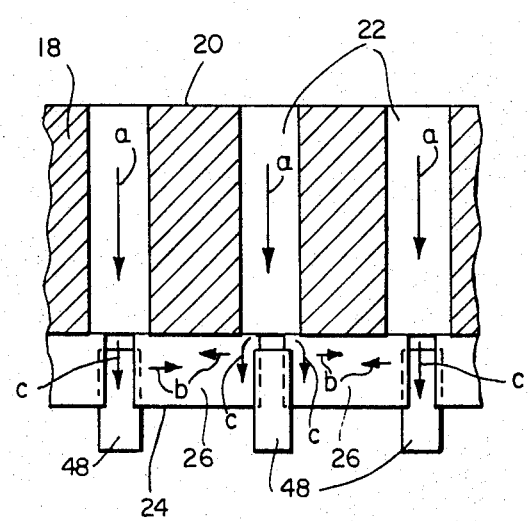
FIG. 5 is an enlarged sectional view of a portion of the extrusion die shown in FIG. 4.
Figure 3:
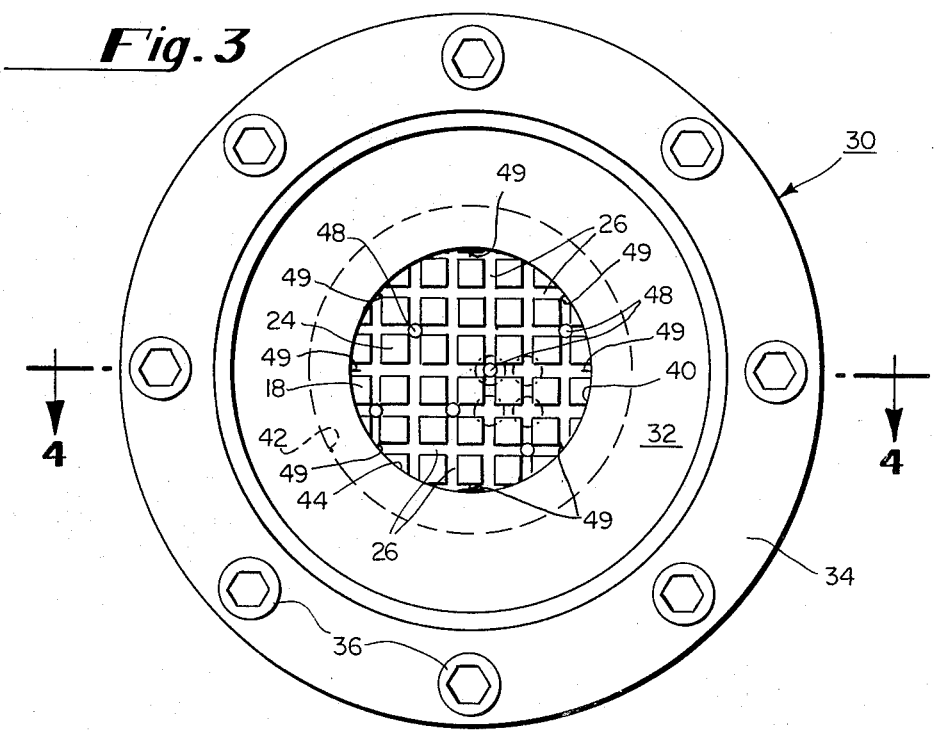
FIG. 3 is a bottom plan view of an extrusion die apparatus embodying this invention.
Figure 4:
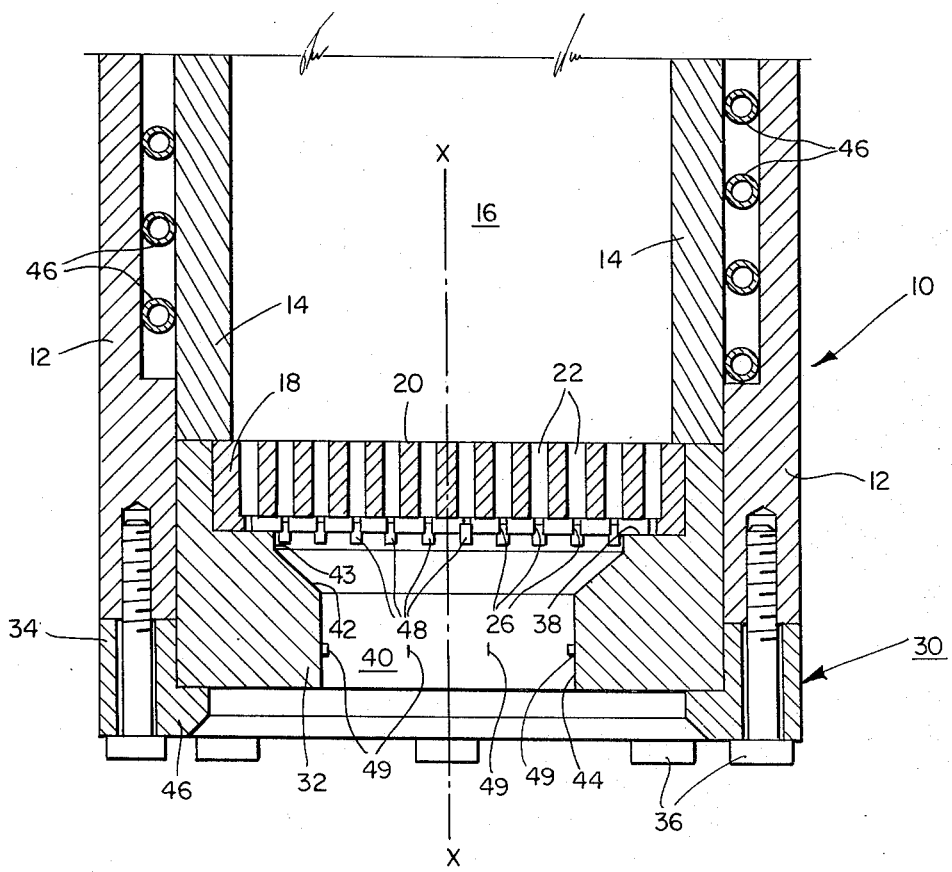
FIG. 4 is a sectional view of the extrusion die apparatus of FIG. 3 taken along line 4—4.

In extruding the monolithic honeycombed structures utilizing the apparatus of FIGS. 3 and 4, the extrudable material is initially longitudinally flowed through the feed passageways 22 as depicted by arrows a in FIG. 5. Subsequently, the extrudable materials is flowed laterally and longitudinally through the discharge slots 26 as depicted by the arrows b and c respectively in FIGS. 5 and 6. The flow of extrudable material is however obstructed by pins 48 which protrude beyond the outlet face 24 of the die 18 where there is no lateral flow so as to create the discontinuity 8 in the structure 2. Although the pins 48 may be flush with the outlet face 24, it is desirable to have the pins 48 extend outwardly beyond the face so as to facilitate insertion and removal of the pins.

Figure 7:
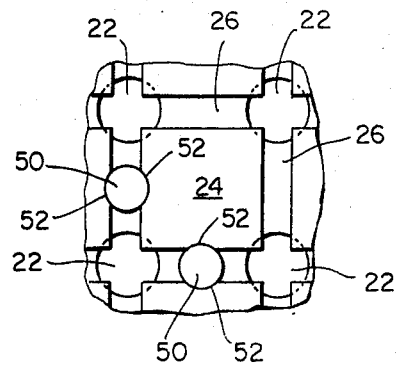
FIG. 7 is a partial end view of an extrusion die in another embodiment of the invention.

FIG. 7 depicts a slight modification in the apparatus of FIGS. 3 and 4 wherein the elongated obstructing elements comprise pins 50 which are located between the junctions of the interconnecting discharge slots 26. In order to firmly lodge the pins 50 in place within the discharge slots 26, grooves 52 are provided in the walls of the discharge slots for receiving portions of the pins 50. If soldering, brazing, welding or an adhesive are utilized to hold the pins in place, grooves 52 may be omitted and the diameter of pins 50 may be the same as the width of the slots 26.

Figure 6:
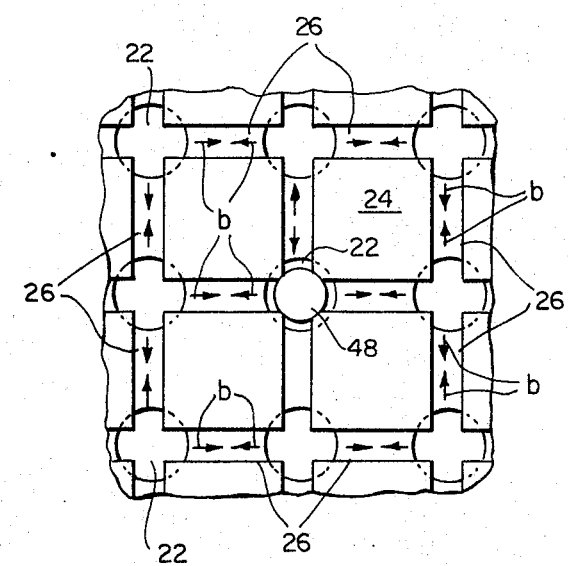
FIG. 6 is an enlarged end view of the extrusion die portion shown in FIG. 5.

In order to maximize the surface area of the honeycomb structure, the obstructing pins in the embodiments of FIGS. 6 and 7 have a diameter which is substantially less than the distance between the junctions of the slots 26. The actual diameters of the pins 48 and 50 are less than three times the thickness of the discharge slots 26.

Figure 8:
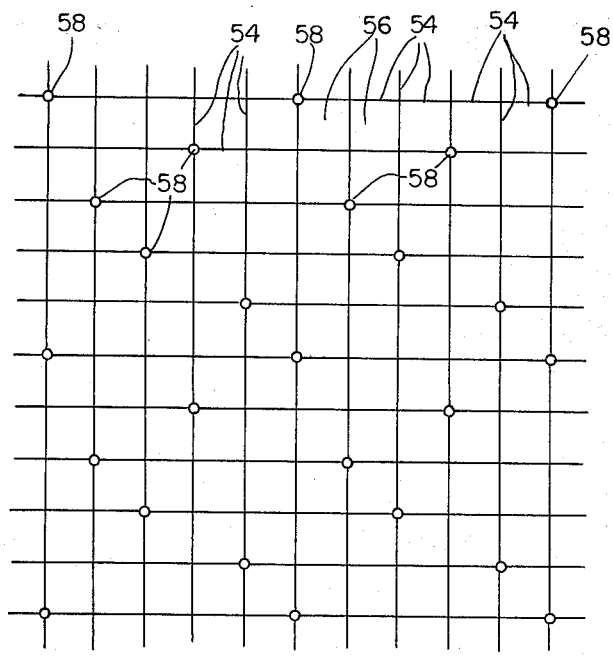
FIG. 8 is a schematic sectional representation of a honeycombed structure with square cells embodying the invention.

In accordance with another important aspect of the invention, the longitudinal discontinuities in the monolithic honeycombed structures have predetermined locations so as to accommodate the thermal expansion and contraction in all lateral directions. This is accomplished by providing at least one discontinuity in each series of cell walls lying in a single plane. As shown in FIG. 8, cell walls 54 forming cells 56 which are square in cross-section are interrupted by discontinuities 58 (represented by circles) where there are two discontinuities for every five cells. The uppermost horizontal series of cell walls 54 is interrupted by three discontinuities 58. The horizontal series of cell walls 54 immediately below is interrupted by two discontinuities 58. Note that each horizontal series below the uppermost two horizontal series are also interrupted by two and in some cases three discontinuities 58. The same is also true of the vertical series of cell walls 54.

In practice, there may be some rather short series of cell walls lying in single planes which run along the periphery of the structure. In some instances, these short series of cell walls may not include a discontinuity. In general, however, each series of cell walls which has a length in excess of 50% of the maximum lateral cross-sectional dimension of the structure will have at least one discontinuity. Also, each series of cell walls will include at least one discontinuity for each ten cell walls in the series and preferably at least one discontinuity for every five cells in the series. In the embodiment of FIG. 8, there is one discontinuity 58 for every five cell walls 54 in each horizontal and vertical series.

Figure 9:
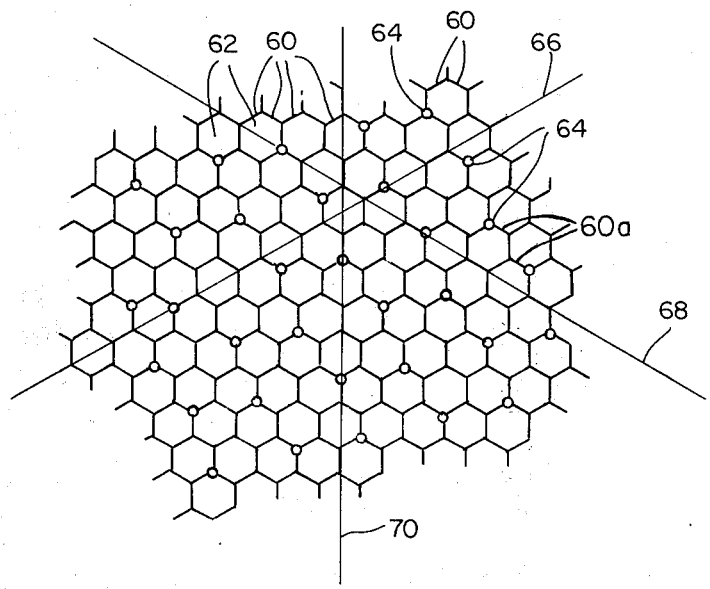
FIG. 9 is a schematic sectional representation of a honeycombed structure with hexagonal cells embodying the invention.

In the embodiment of FIG. 9, cell walls 60 form hexagonally shaped cells 62. The cell walls 60 include discontinuities 64 (represented by circles) where there is one discontinuity 64 for every three cells 62. As in the embodiment of FIG. 8, each series of cell walls lying in a single plane includes at least one discontinuity 64. In this connection, each series of cells lying in a plane depicted by the lines 66 and 68 and 70 include at least one discontinuity. The same is true with respect to every other series of cell walls lying in a single plane.

Figure 9A:
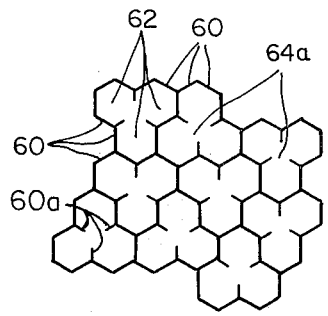
FIG. 9a is a schematic sectional representation of a honeycombed structure similar to that of FIG. 9 with enlarged discontinuities.

In the embodiment of FIG. 9a which visually emphasizes the two-dimensional flexibility of the structure, substantial portions of the walls 60a of the hexagonally shaped cells 62 are deleted so as to produce very large discontinuities 64a. This is a particularly desirable structure to utilize where there is a likelihood that long unsupported walls 60a which are interrupted by the smaller discontinuities 64 (see FIG. 9) will break off from the rest of the structure and a lesser surface area may be tolerated.

Figure 10:
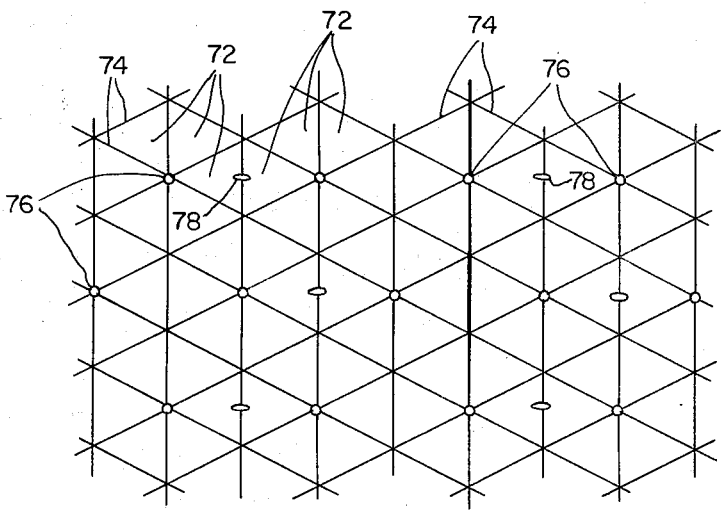
FIG. 10 is a schematic sectional representation of a honeycombed structure with triangular cells embodying the invention.

Triangular shaped cells 72 formed by the cell walls 74 are shown in the monolithic structure schematically depicted by FIG. 10. The cell walls 74 include discontinuities 76 (represented by circles) located at the junctions of cell walls 74 and discontinuities 78 (represented by elipses) located between junctions of the cell walls 74. In the embodiment of FIG. 10, there are three discontinuities for every twelve cells in the structure. Furthermore, there is at least one discontinuity for every four cell walls in each series of cell walls lying in a single plane.

Figure 11:
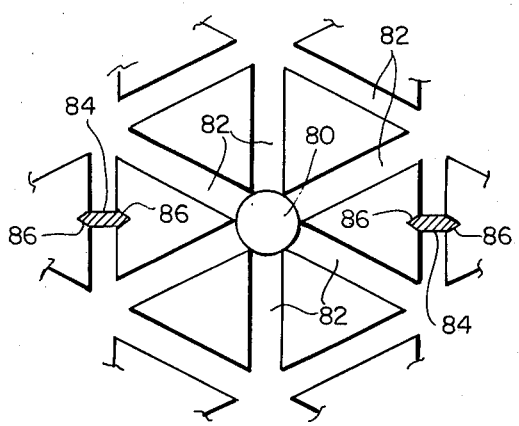
FIG. 11 is an enlarged end view of a portion of an extrusion die for making the structure shown in FIG. 10.

FIG. 11 shows a portion of the outlet face of an extrusion die for forming the structure shown in FIG. 10. As shown there, an obstructing element in the form of a pin 80 located at the junction of interconnected discharge slots 82 forms one of the discontinuities 76. As in the embodiment of FIGS. 3–6, the pin 80 is firmly lodged in place within the discharge slots 82.

In addition, obstructing elements in the form of slitters 84 are provided which are located mid-way between junctions of the discharge slots 82 so as to form the discontinuities 78. As shown, the slitters 84 are elongated in cross-section with the ends of the elongated section being received by grooves 86 in the walls of the extrusion slots 82. Grooves 86 cooperate with the pointed edges of the slitter 84 so as to firmly lodge the slitters 84 in place.

The material which is extruded through the extrusion die apparatus may comprise various ceramic materials including the ceramic extrusion batches disclosed in copending application Ser. No. 384,935, filed Aug. 2, 1973 (assigned to the assignee of this application now abandoned) and incorporated herein by reference. After the structure is extruded through the die, the structure is dried and fired to form a cordierite body, a cordierite spinal body, a spodumene body, a mullite body or other ceramic body depending upon the nature of the extrusion batch.

In addition, other sinterable materials may be utilized. For example, powdered metals may be used or combinations of powdered metals and ceramic materials. Although a thermal shock induced stress which exceeds the elastic limit of a sintered powdered metal structure may not result in fractures which would occur in ceramic structures, exceeding the elastic limit could result in permanent deformation of the sintered powdered metal structure even though it is characterized by a fair degree of ductility as compared with a ceramic structure. It is therefore desirable to provide the longitudinal discontinuities in the cell walls of such structures in accordance with this invention to avoid such deformation. The same is also true with respect to other relatively ductile sinterable materials such as sinterable organic resin powders.

As pointed out previously, the various cell shapes may be utilized and the invention is in no sense limited to the use of the cells shown in the drawings. In this connection, it should be understood that various other shapes might be utilized, such as rectangles and diamonds. Moreover, various cell sizes might be utilized with density ranging from 20 or less to 900 or more cells per square inch and with cell wall thicknesses ranging from 0.003 or less to 0.050 or more inches.

As described in the foregoing, the honeycombed structure may be circular in cross-section. It will of course be understood that other structure configurations might be utilized, e.g., a structure of oval or square cross-section with or without a skin or casing.

In the embodiments of the invention shown in the drawings, the discontinuities have been substantially uniformly distributed throughout the structure. This need not be the case however. In some instances, it may be desirable to provide a heavier concentration of discontinuities in particular area of the structure consistent with stress distribution. Also, it may be desirable to provide discontinuities in less than all the planes of the matrix. For example, it may be preferable to provide discontinuities in the vertical planes only of the structure shown in FIG. 8. Similarly, it may be preferable to provide discontinuities in only two of the three sets of parallel planes shown in FIG. 10.

Although preferred embodiments of the invention have been shown and described and various alternatives and modifications have been suggested, it will be understood that the appended claims are intended to cover all embodiments and modifications which fall within the true spirit and scope of the invention.

What is claimed is:

1. A monolithic honeycombed structure of sintered material comprising a plurality of interconnected walls forming open-ended cells extending longitudinally through the structure, said walls including a plurality of discontinuities extending longitudinally through the entire length of the structure and transversely through said walls, said discontinuities having a width substantially less than the distance between junctions of said interconnected walls.

2. The monolithic structure of claim 1 wherein said discontinuities are located at predetermined junctions of said interconnected walls.

3. The structure of claim 2 wherein said discontinuities are also located between predetermined adjacent junctions of said interconnected walls.

4. The monolithic structure of claim 1 wherein said discontinuities are located between predetermined adjacent junctions of said interconnected walls.

5. The monolithic structure of claim 1 wherein each series of walls lying in at least one set of parallel planes and having a length in excess of 50% of the maximum cross-sectional dimension of said structure includes one of said discontinuities in at least one of said walls in said series.

6. The monolithic structure of claim 5 wherein each said series of walls includes at least one discontinuity for every ten cell walls in said series.

7. The monolithic structure of claim 5 wherein each said series of walls includes at least one discontinuity for every five cell walls in said series.

8. The monolithic structure of claim 1 comprising at least one discontinuity for every ten cells in said structure.

9. The monolithic structure of claim 1 wherein said structure comprises at least one discontinuity for every five cells in said structure.

10. The monolithic structure of claim 1 wherein the discontinuity has a maximum lateral dimension substantially less than the distance between adjacent junctions of said interconnected walls.

11. The monolithic structure of claim 10 wherein the maximum lateral dimension of the discontinuity is less than three times the thickness of the cell walls.

12. The monolithic structure of claim 11 comprising a skin at the periphery thereof having discontinuities therein extending longitudinally of the structure and transversely through the skin.

13. A ceramic monolithic honeycombed structure comprising a plurality of interconnected walls forming open-ended cells extending longitudinally through the structure, said walls including a plurality of discontinuities extending longitudinally through the entire length of the structure and transversely through said walls, said discontinuities having a width substantially less than the distance between junctions of said interconnected walls.

14. The monolithic structure of claim 13 wherein said discontinuities are located at predetermined junctions of said interconnected walls.

15. The structure of claim 14 wherein said discontinuities are also located between predetermined adjacent junctions of said interconnected walls.

16. The monolithic structure of claim 13 wherein said discontinuities are located between predetermined adjacent junctions of said interconnected walls.

17. The monolithic structure of claim 13 wherein each series of walls lying in at least one set of parallel planes and having a length in excess of 50% of the maximum cross-sectional dimension of said structure includes one of said discontinuities in at least one of said walls in said series.

18. The monolithic structure of claim 17 wherein each said series of walls includes at least one discontinuity for every ten cell walls in said series.

19. The monolithic structure of claim 17 wherein each said series of walls includes at least one discontinuity for every five cell walls in said series.

20. The monolithic structure of claim 13 comprising at least one discontinuity for every ten cells in said structure.

21. The monolithic structure of claim 13 wherein said structure comprises at least one discontinuity for every five cells in said structure.

22. The monolithic structure of claim 13 wherein the discontinuity has a maximum lateral dimension substantially less than the distance between adjacent junctions of said interconnected walls.

23. The monolithic structure of claim 22 wherein the maximum lateral dimension of the discontinuity is less than three times the thickness of the cell walls.

24. The monolithic structure of claim 13 comprising a skin at the periphery thereof having discontinuities therein extending longitudinally of the structure and transversely through the skin.

\* \* \* \* \*